Dec. 15, 1942.  E. RICCARDI  2,305,306
FOUR-CYCLE SCAVENGING ENGINE
Filed Sept. 23, 1940  4 Sheets-Sheet 1
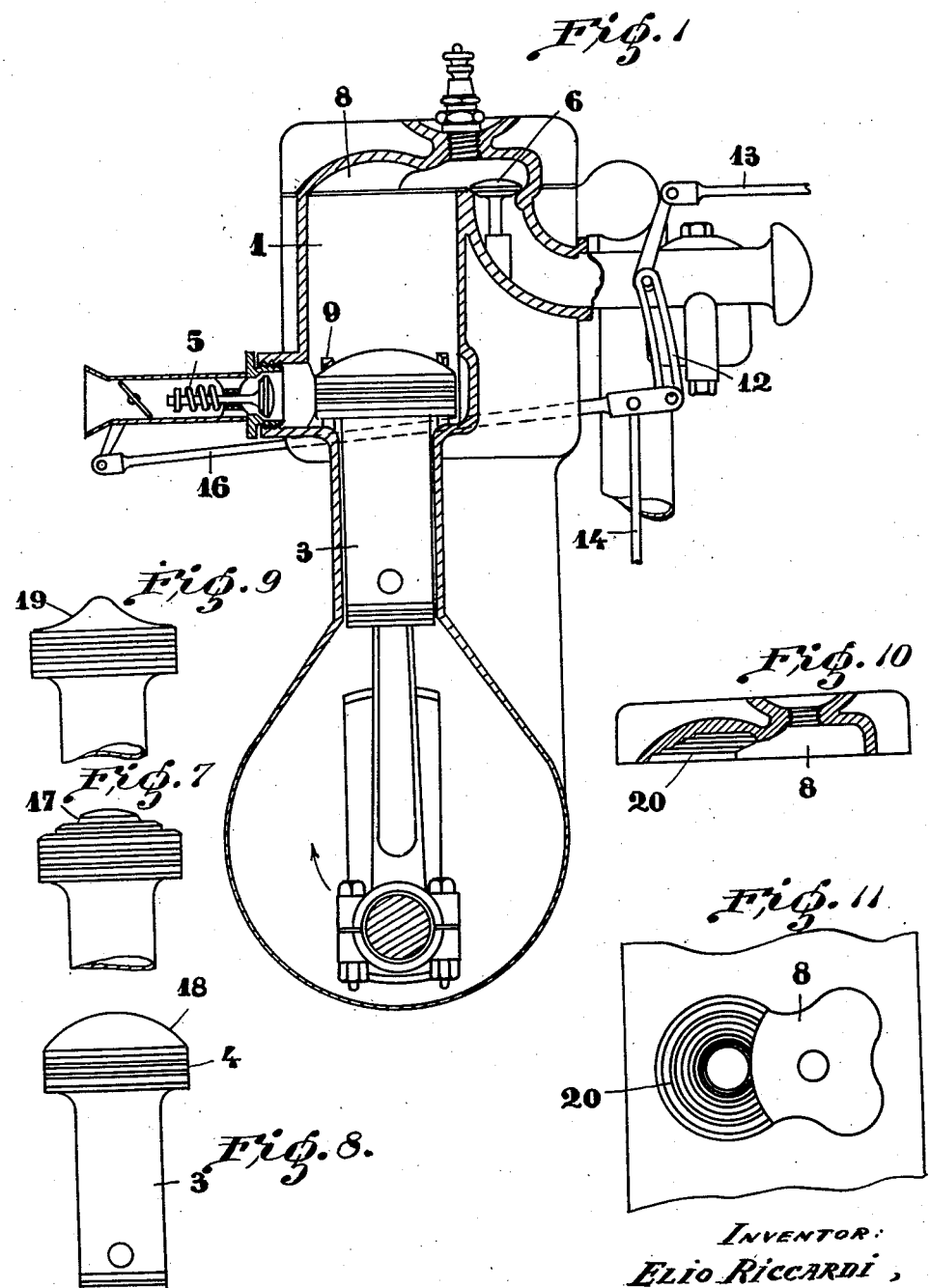
INVENTOR:
Elio Riccardi,
BY: Wallauster & Groff
ATTORNEYS.

Dec. 15, 1942. E. RICCARDI 2,305,306
FOUR-CYCLE SCAVENGING ENGINE
Filed Sept. 23, 1940   4 Sheets-Sheet 2
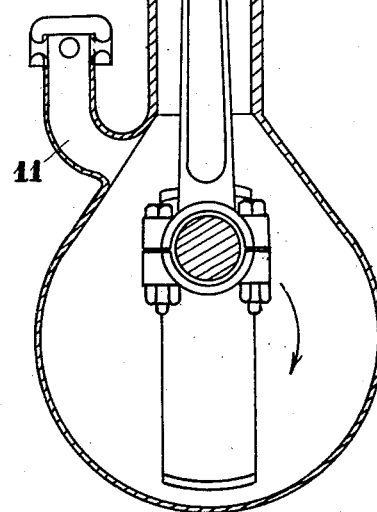
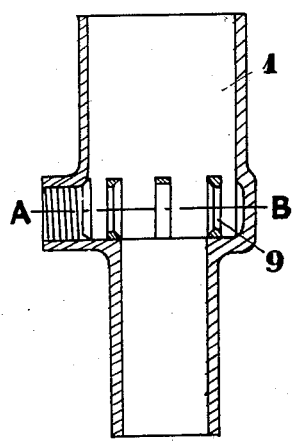
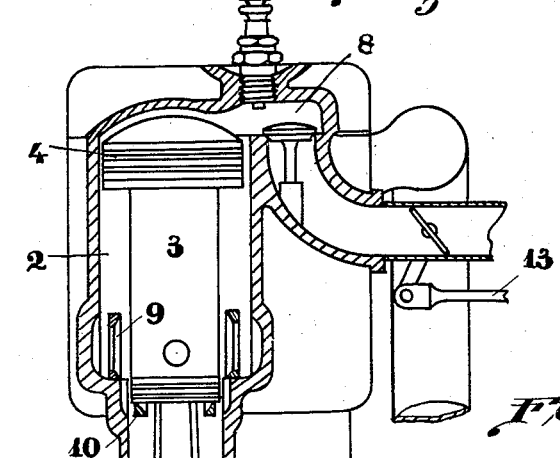
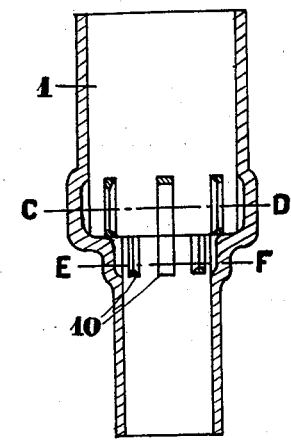
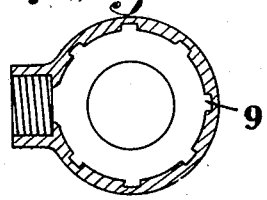
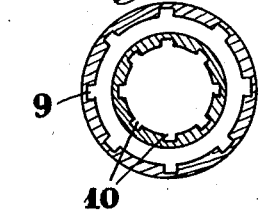
INVENTOR:
Elio Riccardi,
BY: Wachanston &Groff
ATTORNEYS.

Dec. 15, 1942.     E. RICCARDI     2,305,306
FOUR-CYCLE SCAVENGING ENGINE
Filed Sept. 23, 1940     4 Sheets-Sheet 3 a b c d e

INVENTOR:
Elio Riccardi,
BY
ATTORNEYS.

Dec. 15, 1942.  E. RICCARDI  2,305,306
FOUR-CYCLE SCAVENGING ENGINE
Filed Sept. 23, 1940  4 Sheets-Sheet 4 f g h i l

INVENTOR:
Elio Riccardi,
BY: Willauster & Groff
ATTORNEYS.

Patented Dec. 15, 1942

2,305,306

UNITED STATES PATENT OFFICE 2,305,306

FOUR-CYCLE SCAVENGING ENGINE

Elio Riccardi, Rome, Italy; vested in the Alien Property Custodian

Application September 23, 1940, Serial No. 358,017. In Italy September 27, 1939

1 Claim. (Cl. 123—76)

The present invention relates to a new cycle of operation of internal combustion motors, which may be applied to a new type of motor, and which may also be applied to existing motors by suitably transforming them.

By using the cycle according to the present invention, on equal conditions of weight and volumetric capacity of the best existing motors, the efficiency is increased of at least 50 to 60 per cent in favour of the former.

The new cycle is specially suitable for aircraft motors as it allows to compensate for the decreased air pressure obtaining at high altitudes; for motors fed with gas, whereby the power is increased, without increasing the weight or the volume of the cylinders; for multi-carburating motors; in which the strength of the mixture and the amount of the compression may be varied even when the motor is running.

The motor according to the present invention provides a number of additional advantages, which consist in allowing the complete filling of the cylinder with the explosive mixture, in the positive expulsion of the exhaust gases from the cylinder, and in cooling effectively the cylinder and the piston, thus obtaining an increase of power of the motor.

In the present combustion motors the scavenging of the explosion chamber is not complete, this incomplete scavenging resulting both in a substantial decrease of the efficiency of the motor and a considerable decrease of power which might otherwise be obtained from it.

The motor adapted for operating the working cycle according to the present invention, eliminates positively and in a simple way the disadvantages above enumerated. The invention comprises the construction of both the cylinder and of the piston with two different diameters. The smaller piston reciprocating the smaller cylinder forms an auxiliary scavenging air pump operating synchronously with the piston of the motor. By leaving unvaried the motor cylinder both with respect to its stroke and its capacity, in the lower portion, the different diameter of the piston forms an auxiliary cylinder, and by leaving unaltered the four cycle operation of the motor cylinder, three supplementary working phases are inserted in the auxiliary cylinder on each turn of the driving shaft, said phases being the following:

(1) Suction of supplementary air, (2) compression of supplementary air, and (3) passage of the supplementary air from the auxiliary cylinder to the motor cylinder.

Said cycle is repeated twice in each working cycle.

The operation of the cycle above mentioned is obtained, according to the present invention, in a very simple way with one or the other of the devices hereinafter described.

The first of these devices (type A) illustrated in Figures 1 and 9, shows the suction of the air into the auxiliary cylinder, operated by means of an automatic valve, or a valve controlled by the distribution gear, and the second arrangement (type B) shown in Figures 2 and 10, illustrates, an arrangement in which the suction of supplementary air is effected, without valves, from the casing of the motor.

The second diameter of the piston, below the head, may be calculated in accordance to the use and to the operation of the motor.

The accompanying drawings show clearly and by way of example a practical form of realization of the invention, applied to a F. I. A. T. motor No. 521–522. In the drawings:

Fig. 1 shows an axial section in elevation of a motor cylinder (type A), provided with a petrol carburetter and with a supplementary air admission valve, which is designed to be operated either automatically, or which may be controlled by the distributing gear, and which may be disposed in another point of the cylinder.

Fig. 2 shows an axial section, similar to that shown in Fig. 1, illustrating the type B of the motor according to the invention, in which the suction valve of the supplementary air is replaced by the suction and admission from the casing of the motor.

Fig. 3 shows an axial section of the cylinder of the "A" type.

Fig. 4 shows an axial section of the cylinder of the "B" type.

Fig. 5 is a section in plan through line A—B of Fig. 3.

Fig. 6 is a section in plan through the lines C—D and E—F of Fig. 4.

Fig. 7 shows in elevation a piston formed as a stepped hemisphere;

Fig. 8 shows in elevation a piston formed as a smooth hemisphere;

Fig. 9 shows in elevation a piston formed as a projecting knob;

Fig. 10 shows in vertical section the cylinder head provided with a number of concentric grooves;

Fig. 11 shows in bottom plan the cylinder head of Fig. 10;

Figure 12:
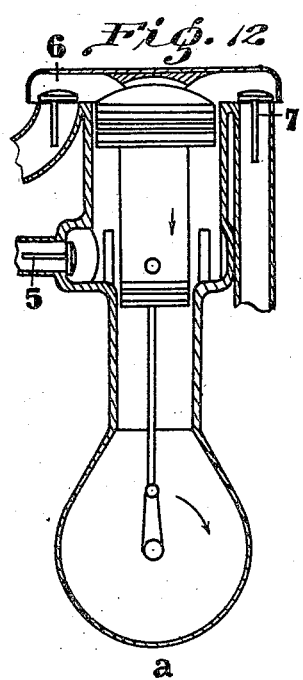
Figs. 12–16 show successive operating positions of the piston in the operating cycle of one type (A) of motor for the first revolution of the motor shaft.
Figure 13:
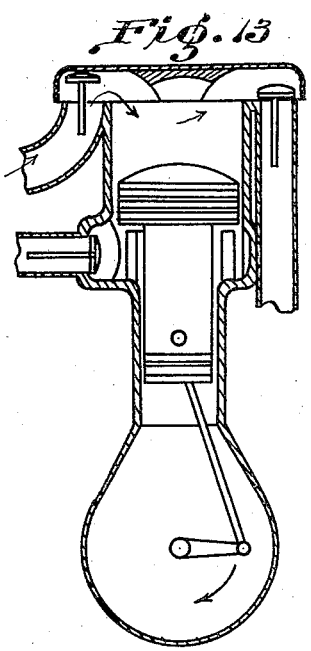
Figure 14:
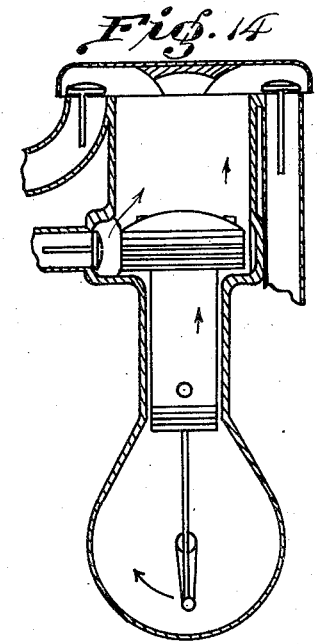
Figure 15:
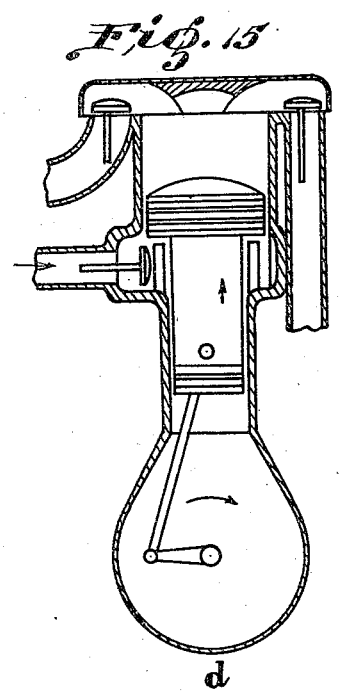
Figure 16:
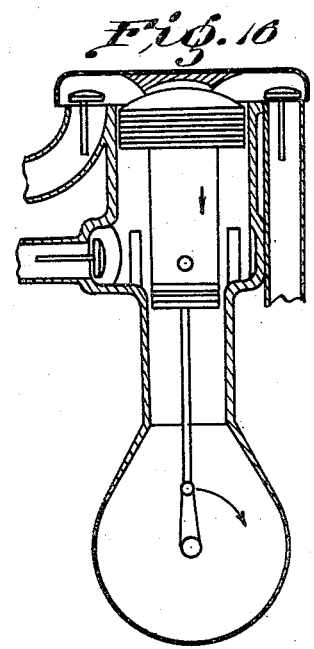

In the figures above mentioned, 1 (Fig. 1) is the cylinder, the piston being shown below; 2 (Fig. 2) is the auxiliary cylinder, with the piston above it; 3 is the lower portion of the piston; 4 indicates the upper portion of the piston with its head; 5 is the supplementary air intake with the automatic valve; 6 is the suction valve of the motor; 7 is the discharge valve of the motor (Figs. 12–21); 8 is the explosion chamber; 9 shows the channels or grooves for the passage of supplementary air from the auxiliary cylinder to the cylinder of the motor; 10 shows the channels or grooves for the passage of supplementary air from the auxiliary cylinder; 11 is the supplementary air intake in the casing of the motor; 12 is the cam for regulating the quantity of air in the mixture; 13 is the control rod of the carburetor adapted for the motor type "A" (Fig. 1), or for the gas admission valve for the type "B" (Fig. 2); 14 is the control rod for the connecting rod 16; 15 is the control lever for the intake valve of the supplementary air; 16 is the control rod of the lever 15, between the cam 12 and the lever 15; 17 is the head of the piston shaped as a stepped hemisphere; 18 shows the head of the piston hemispherically shaped; 19 shows another piston head provided with a projecting knob; and 20 shows a number of concentric grooves arranged on the head of the motor.

Figures 12–21 indicate schematically respectively the operating cycles of the motor during a complete revolution of the driving shaft ("A" type motor), and the cycles of operation of the "B" type motor during the same period. As the operation of the auxiliary cylinder is similar and synchronous during each revolution, it is easy to follow the working of each of said types by adding to the complete cycle of operation, two turns of the crank shaft. The normal cylinder of the motor, in the upper portion with respect to the head of the piston, operates as a driving cylinder 1 (Fig. 1), and in the lower portion with respect to said head, operates as an auxiliary cylinder 2 (Fig. 2). The following tables are intended to explain the schemes of operations respectively indicated diagrammatically in Figures 12–21.

| Driving cylinder | Auxiliary cylinder |
|---|---|
| *Scheme of Figs. 12–16* | |
| 1st cycle: Suction (starting with pure air in the explosion chamber). | (a) Completely filled with air.<br>(b) Phase of compression of supplementary air.<br>(c) Passage of supplementary air from the auxiliary cylinder to the driving cylinder, at superatmospheric pressure and formation of the mixture with great turbulence in said cylinder. |
| 2nd cycle=compression | (d) Suction of supplementary air.<br>(e) End of the suction of supplementary air. |
| *Scheme of Figs. 17–21* | |
| 3d cycle=explosion | (f) Passage of supplementary air from the casing of the motor to the auxiliary cylinder.<br>(g) Compression of supplementary air.<br>(h) Passage of supplementary air from the auxiliary cylinder to the driving cylinder, for securing the forced discharge from said cylinder. |
| 4th cycle=discharge | (i) Suction with vacuum (depression) openings 10 being covered.<br>(l) Passage of supplementary air from the casing to the auxiliary cylinder. |

In the description which follows of the operation of the motor according to Figures 1 and 12–16, it is supposed that gasoline is used as driving combustible, said operation being similar to that of the motor shown in Figs. 12–21.

Figure 17:
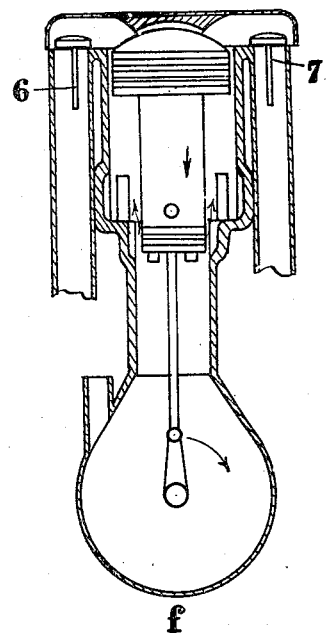
Figs. 17–21 show successive operating positions of the piston in the operating cycle of another type (B) of engine for the second revolution of the motor shaft.
Figure 20:
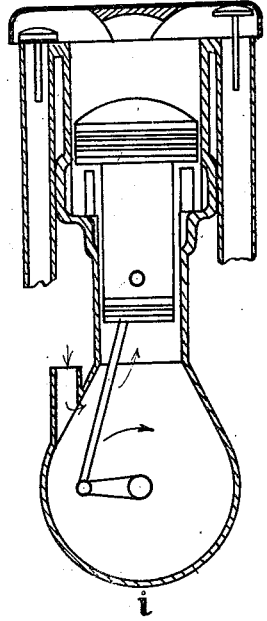
Figure 21:
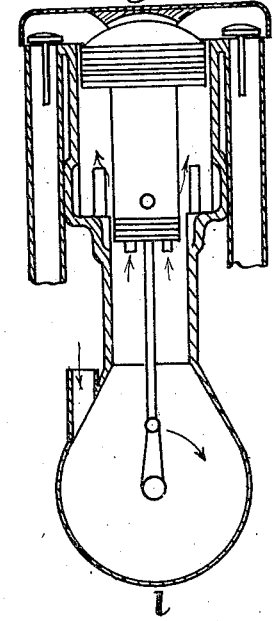

At the starting of the phase of suction (Fig. 12), the explosion chamber 8, is filled, not with exhaust gases, as is the case in common motors, but with pure air, and the portion of the cylinder which is below the head of the piston, and which at this moment acts as an auxiliary cylinder, is also full of air; the suction valve 5 of the supplementary air being closed. As the piston descends, the suction valve 6 of the motor opens, and in the upper portion above the head of the piston, in the driving cylinder (Fig. 13), the rich mixture is sucked, while in the auxiliary cylinder the supplementary air is compressed. When the piston arrives at the end of the suction stroke in the driving cylinder, the ports 9 are uncovered, and the air which was compressed into the auxiliary cylinder, flows with great force and at a superatmospheric pressure into the driving cylinder (Figs. 12—16) just at the moment when the greatest depression exists in said driving cylinder due to the suction, forming therein, owing to strong turbulence, a good and homogeneous explosive mixture. As the driving shaft continues to rotate, the piston begins its upward stroke, the suction valve 6 of the motor closes, and the piston closes the ports 9, while the upper portion of its head forms a depression in the auxiliary cylinder. Moreover, valve 5 opens so that in said cylinder, air is again sucked in (Fig. 15) and at the end of the upward stroke, the explosion occurs in the driving cylinder (Fig. 17). As the piston descends, (Fig. 18) air is compressed in the auxiliary cylinder; and before the piston arrives to the end of its stroke, and before it uncovers the air ports 9, at a point between 1 and 2, the discharge valve 7 of the motor opens so as to permit the exit of the exhaust gases. When the piston arrives at the end of its bottom stroke, the compressed air contained in the auxiliary cylinder, passes with great force into the driving cylinder (Fig. 19), and being in excess relatively to preceding combustion of the mixture, blows out the flame of said combustion, cools the gas and forces it towards the discharge (Fig. 20). The exhaust gas so cooled decreases immediately its volume and blows out into the atmosphere at almost barometric pressure.

As the air has pushed and followed the gas towards the exhaust valve, when this latter closes, only pure air will remain in the explosion chamber (Fig. 21) which is a great advantage for the efficiency of the motor.

Figure 18:
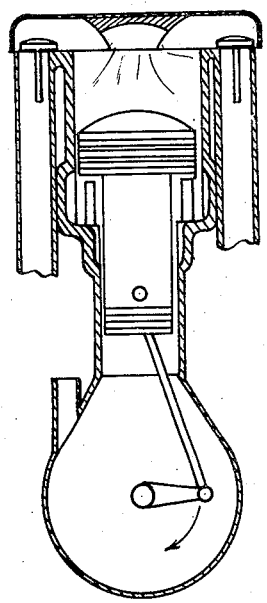
Figure 19:
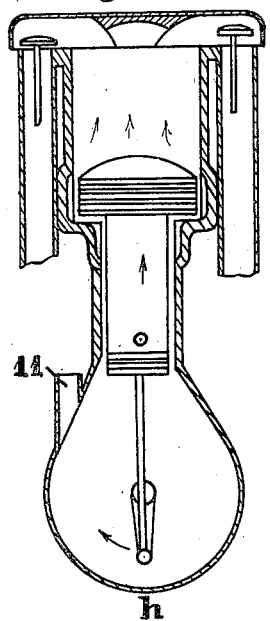

The working with gas for the "B" type motor is similar to that just described, the only difference being that by the suction type of the motor only gas is sucked. The drawings show clearly the working operation of this type of motor; the air instead of being sucked through the valve 5, is sucked within the casing by means of the suction pipe 11, and at the end of the upward stroke of the piston, the air, passing through the grooves 10 (Figs. 2 and 17-21) is admitted into the auxiliary cylinder 1 (Fig. 17), directly on the piston starting its downwards stroke; said grooves being closed by the piston itself, while the air is compressed in the auxiliary cylinder (Fig. 18).

When working with gasoline, the carburettor is regulated so as to obtain a mixture rich in gasoline, in order that when the supplementary air has been admitted at the end of the suction stroke, a correct mixture may be obtained.

The present invention provides a satisfactory solution of the problem of gas producers applied to road vehicles, in view of the fact that a gasoline motor, after being transformed with the provisions described above, acquires an efficiency from 120 to 130 per cent higher than the efficiency it had when operated with gasoline, without changing its dimensions.

In order to transform a normal motor into a motor of the type of the invention, it is sufficient to construct the new piston and to provide with a jacket the lower portion of the cylinder, then insert the grooves 9 and introduce in them the supplementary air intake with the valve 5 (for the "A" type motor) or to provide the grooves 10 in the jacket (for the "B" type motor).

The control 15 of the butterfly valve of the supplementary air (Fig. 1) is synchronous with respect to the control of carburettor 13 at all conditions of running, so that by moving either with a pedal or by hand from the control board the rod 13, the valve of the carburettor opens, and at the same time the cam lever 12, which is integral with said valve and which controls by means of the rod 16 the supplementary air valve. When it is desired to change the amount of the supplementary air in order to obtain the correct mixture, the control rod 14, which displaces in the cam sector 12 the pivot of connecting rod 16, is moved, and as this latter controls the butterfly valve of the supplementary air, the ratio of transmission between the butterfly valve and the valve of the carburettor is caused to be varied, thus causing the variation of the opening stroke of the supplementary air port, and thus synchronizing the composition of the mixture at all the changes in the running conditions of the motor. Owing to the characteristic of the cam, the composition of the mixture is maintained synchronous, constant and homogeneous.

The greater length and the double support of the piston in the cylinder, annul the friction side reactions, thus increasing the life of the motor.

The working cycle according to the invention is adapted for aviation motors and specially for high altitudes; at low altitudes the motor works normally by sucking the mixture from suction valve 6, while the air intake valve 5 is closed. As the aircraft gets higher, and as soon as the air depression is felt by the motor, the supplementary air intake valve 5 is progressively opened, either by hand or by means of any known automatic devices, and it will then be easy to regulate in accordance thereto the carburettor so as to obtain always the mixture of the correct and constant composition.

In operating when the supplementary air intake valve is closed, as the depression forming in the auxiliary cylinder would cause a slight overcharging of the motor, a valve lifting device is provided so that the air contained in the auxiliary cylinder may freely enter and exit without meeting with any resistance.

Naturally, for a multi-cylinder motor, it is sufficient to provide a single supplementary air valve which may be inserted in the collecting tube.

As in the "A" type motor the supplementary air admission may be controlled and regulated as desired, the volumetric capacity of the driving cylinder remaining unvaried, it is possible to obtain a great elasticity of the final compression of the mixture, thus obtaining a variable degree of compression also when the motor is running.

The degree of compression of the supplementary air in the auxiliary cylinder may be regulated, in the "A" type motor, by opening valve 5, and by adjusting the height of the ports 9 in both types "A" and "B."

Owing to the great elasticity of the motor, when used on self-propelling vehicles, it is possible to reduce the number of the gears in the gear boxes, down to two only.

The cycle according to the invention may also be used in connection with a two-cycle motor.

On equal conditions of power output, the new cycle motor has a weight of about 60% of that of a normal actual motor.

The obtaining of the greater power developed by a normal motor modified as described, or by a newly constructed motor having normal dimensions, may be easily demonstrated. In fact, by taking for example the sizes of a Fiat motor No. 521 or 522, which have the diameter of the cylinder of 72 mm. stroke 103 mm. and a cylinder volume of 418 cubic centimeters, supposing that the lower diameter of the piston is 48 mm., the annular capacity remaining in the auxiliary cylinder is 232 cubic centimeters, and supposing a degree of compression of 6:1, there will be an additional 81 cubic centimeters, as in the present case the explosion chamber at the end of the discharge stroke, always contains air which may be carburetted. In other terms:

$$418 + 232 + 81 = 731$$

cubic centimeters of pure mixture, are obtained in each cylinder of the motor, compressed initially, instead of 418 cubic centimeters of mixture, containing an additional 81 cubic centimeters of exhaust gases; the power developed being in proportion of the two above said charges.

The cooling both of the piston and of the cylinder is more efficient, as in normal motors only during one phase (phase of suction) out of four, the cylinder sucks cold air, while with the motor according to the invention, on every four phases, the cylinder and the piston come in contact three times with cold air, and even considering that the compression of air develops a certain amount of heat, the cooling will always result more intense.

The cycle above described may also be effected with a multi-carburetting motor, i. e.; it may be used with combustible of varying density and specific weights, both gaseous or liquid, by suitably adjusting thereto the admission of supplementary air.

What I claim is:

In a four-cycle internal combustion engine, a cylinder member having at one end a combustion cylinder and at the other end a compression pump chamber of smaller diameter than said combustion cylinder, a piston having a head reciprocable in said combustion cylinder and having a relatively long cylindrical rear projection of less diameter than said head and reciprocable in said pump chamber, inlet and exhaust ports for said combustion cylinder, port means in the wall of said combustion cylinder near the end thereof adjacent said chamber and communicating with said chamber, and positioned to be placed in communication with said combustion cylinder when said piston head is in its farthest position of travel toward said chamber, intake control means for said combustion cylinder for controlling the fuel mixture supplied thereto, intake valve means for admitting air to said pump chamber, and common control means actuatable by the position of said piston for simultaneously controlling said intake control means and said valve means for maintaining said valve means closed and said intake control means open on the suction down stroke of said piston and for maintaining said valve means open and said intake control means closed on the return up stroke of said piston.

ELIO RICCARDI.